F. E. OPITZ.
LAWN SPRINKLER.
APPLICATION FILED SEPT. 8, 1908.
961,251. Patented June 14, 1910.
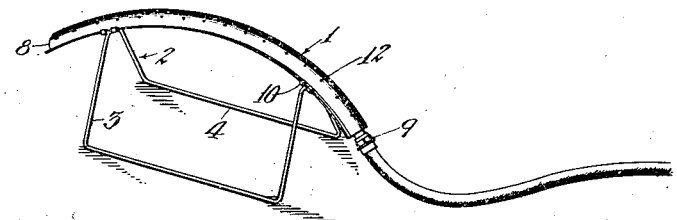
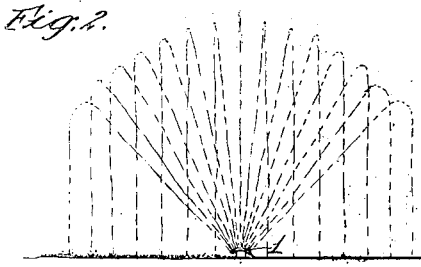
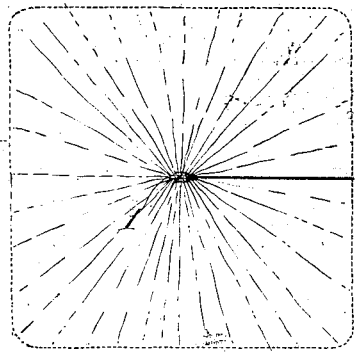
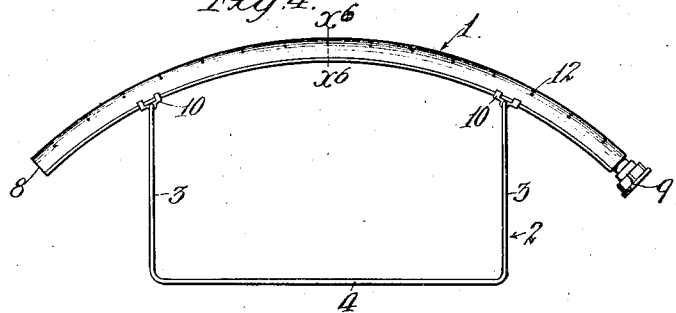
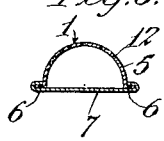
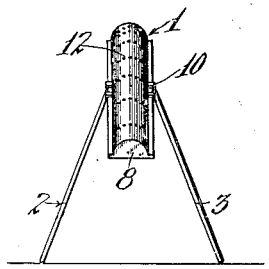

UNITED STATES PATENT OFFICE.

FRANK E. OPITZ, OF LONGBEACH, CALIFORNIA, ASSIGNOR TO BARNEY BROWN AND EDITH H. SPARLING, OF LOS ANGELES, CALIFORNIA.

LAWN-SPRINKLER.

961,251.  Specification of Letters Patent.  Patented June 14, 1910.

Application filed September 8, 1908. Serial No. 452,152.

*To all whom it may concern:*

Be it known that I, FRANK E. OPITZ, a citizen of the United States, residing at Longbeach, in the county of Los Angeles, State of California, have invented a new and useful Lawn-Sprinkler, of which the following is a specification.

The present invention relate to the class of lawn sprinklers in which a stationary tube is used for the distributing means, said tube having a series of perforations which direct the water in jets to distribute it over the lawn.

The main object of the present invention is to so construct a sprinkler of this character that its weight and cost will be reduced to a minimum.

A further object of the invention is to provide a sprinkler of this character which will possess maximum strength and durability.

Another object of the invention is to provide a sprinkler of this type which will spread or direct the water in all directions thereby increasing the area covered in one position of the sprinkler.

The accompanying drawings illustrate my invention.

Figure 1 is a perspective of the device. Fig. 2 is an elevation of the device showing the longitudinal spread of the water. Fig. 3 is a plan of the device showing the spread of the water in all directions. Fig. 4 is a side elevation. Fig. 5 is an end elevation. Fig. 6 is a cross section on line $x^6$—$x^6$ in Fig. 4.

The sprinkler comprises a tubular member 1 bent or curved in arc shape so as to form an arch tube, said member being supported on a stand or support 2, which may consist of wire bent to form two inverted V-shaped portions 3 connected by parallel horizontal portions 4. The tubular member 1 is preferably formed of sheet metal comprising an upper portion 5, semi-circular in cross section and having laterally extending flanges 6, and a bottom portion 7 extending across and closing the bottom of the semi-circular upper portion 5 and having its edges turned over and clenched on the flanges 6, aforesaid, to form a tight joint between the top and bottom portion. One end of this tubular member 1 is closed by a stationary plate 8, and the other end of said tubular member is provided with a screw coupling member or socket 9 or other means for attachment and connection of the hose. The standard portions of the support member 2 are attached to the bottom plate 7, as by means of clips 10, secured to said standards and having flanges 11 clenched over the projecting side portions 7 of the tubular member 1.

The upper portion 5 of the tubular member 1 is perforated, the perforations or openings 12 therein being arranged in a series of rows, each row extending transversely of the tubular member, and the respective rows being distributed lengthwise of the tubular member. The holes in each row extend radially with reference to the curvature of the tube so that holes at different parts, lengthwise of the tube, are directed at variant angles in a longitudinal plane; whereas, different holes in any one row are directed at variant angles in a transverse plane.

The operation of the device is as follows:— The sprinkler having been placed to proper position, and the hose being connected, the water is turned on and issues through the openings 12 in the direction determined by the line of extension of the opening; thus, the water issuing from the middle row of perforations will be distributed approximately in a plane transverse to the tubular member 1 at the center thereof, the lateral divergence of the perforations causing the water so issuing to extend over a considerable distance transversely of the sprinkler. The water issuing from the next row of perforations at either side, in addition to its lateral distribution, will be distributed longitudinally, by reason of the inclination of this row of openings, in a longitudinal plane, and as the inclination of the successive rows increases with the distance from the center, the longitudinal projection of the water will correspondingly increase so that the water is distributed over a considerable distance each way longitudinally of the sprinkler, as shown in Fig. 2, as well as over a considerable distance transversely of the sprinkler, as shown in Fig. 3. The jets of water are indicated in dotted lines in these figures, the trajectory being diagrammatically illustrated by straight lines to show the amount of projection, in place of the actual parabolic course of the jets. By this construction the arched tubular sprinkler may be made considerably shorter than the ordinary straight tubular sprinkler, and can be made to cover an area much larger than that covered by the straight sprinkler, and practically of the same width. One result of this shortening of the sprinkler for a given capacity is that it is rendered much lighter and cheaper. The shortness of the sprinkler also avoids the objectionable buckling which tends to rupture the straight sprinkler, and the arch formed of this sprinkler is also of advantage in this connection, as it presents a construction of maximum strength, both in supporting the weight of the body of water when the sprinkler is in operation and for supporting the sprinkler from the middle when it is being carried. Another advantage of this construction is that it waters the lawn over a substantially rectangular area, which can be increased or diminished in all directions simultaneously by simply varying the pressure of the water.

What I claim is:—

A lawn sprinkler comprising a longitudinally curved tubular member, a support holding said tubular member in position to constitute an arch presenting curvature in a vertical plane of less than half a circle, said tubular member having openings in its upper portion distributed transversely and longitudinally thereof, the openings in different longitudinal portions of the member being presented at different inclinations in a longitudinal plane, and the openings in the different transverse tubular portions being presented at different inclinations in a transverse plane, whereby water issuing from said member through said openings is projected laterally and longitudinally from the openings to cover a rectangular area whose dimensions are greater longitudinally and transversely than the dimensions of the tubular member, closure means at one end of said tubular member and connecting means at the other end of said tubular member for connection of a water supply.

In testimony whereof, I have hereunto set my hand at Los Angeles, California, this 27th day of August, 1908.

FRANK E. OPITZ.

In presence of—
ARTHUR P. KNIGHT,
FRANK L. A. GRAHAM.